(12) United States Patent
Tsai et al.

(10) Patent No.: US 9,441,945 B2
(45) Date of Patent: Sep. 13, 2016

(54) SCAN LENS, INTERFEROMETRIC MEASURING DEVICE USING SAME

(71) Applicant: NATIONAL TAIWAN UNIVERSITY, Taipei (TW)

(72) Inventors: Chien-Chung Tsai, Taipei (TW); Sheng-Lung Huang, Taipei (TW)

(73) Assignee: National Taiwan University, Taipei (TW)

( * ) Notice: Subject to any disclaimer, the term of this patent is extended or adjusted under 35 U.S.C. 154(b) by 84 days.

(21) Appl. No.: 14/037,782

(22) Filed: Sep. 26, 2013

(65) Prior Publication Data
US 2014/0333934 A1    Nov. 13, 2014

(30) Foreign Application Priority Data
May 7, 2013  (TW) .............................. 102116255 A

(51) Int. Cl.
*G01B 9/02*     (2006.01)
*G02B 27/14*    (2006.01)
*G02B 21/00*    (2006.01)

(52) U.S. Cl.
CPC ........ *G01B 9/02015* (2013.01); *G01B 9/02049* (2013.01); *G01B 9/02058* (2013.01); *G02B 21/0056* (2013.01)

(58) Field of Classification Search
CPC ................... G01B 9/02015; G01B 9/020249; G01B 9/02058; G02B 21/0056
USPC ................................................ 356/497, 511
See application file for complete search history.

(56) References Cited

U.S. PATENT DOCUMENTS

| | | | |
|---|---|---|---|
| 2,612,074 A | | 3/1950 | Mirau |
| 4,132,477 A | * | 1/1979 | Watabe .............. G03G 15/0435 355/30 |
| 4,639,139 A | * | 1/1987 | Wyant et al. ................. 356/497 |
| 4,869,593 A | | 9/1989 | Biegen |
| 5,122,648 A | * | 6/1992 | Cohen et al. .............. 250/201.3 |
| 5,166,751 A | | 11/1992 | Massig |
| 5,337,298 A | | 8/1994 | Van Rosmalen |
| 6,633,376 B1 | | 10/2003 | Nishida et al. |
| 7,869,057 B2 | | 1/2011 | De Groot |
| 8,072,610 B1 | | 12/2011 | Schmit et al. |
| 2003/0179430 A1 | | 9/2003 | Kurosawa |
| 2004/0251243 A1 | | 12/2004 | Lizotte et al. |
| 2004/0252310 A1 | * | 12/2004 | De Lega et al. .............. 356/511 |
| 2006/0160332 A1 | | 7/2006 | Gu et al. |
| 2006/0232785 A1 | * | 10/2006 | Grasser et al. ............... 356/512 |
| 2008/0246972 A1 | | 10/2008 | Dubois et al. |
| 2010/0309476 A1 | * | 12/2010 | Millerd ......................... 356/495 |
| 2011/0310395 A1 | * | 12/2011 | Tsai et al. ..................... 356/479 |

FOREIGN PATENT DOCUMENTS

| | | |
|---|---|---|
| TW | 201116355 A | 5/2011 |
| WO | WO2011/126219 A2 | 10/2011 |

* cited by examiner

*Primary Examiner* — Kara E Geisel
*Assistant Examiner* — Dominic J. Bologna

(57) ABSTRACT

A scan lens and an interferometric measuring device using the scan lens are disclosed. The scan lens includes a lens set, a beam splitter, and a reflector disposed between the lens set and the beam splitter. During application the applied light beam passes through the lens set of the interferometric measuring device to fall upon the beam splitter where the light beam that passes through the beam splitter is defined as a first light beam and the light beam that is reflected by the beam splitter is defined as a second light beam. The first light beam is projected onto the test object. The second light beam is projected onto the reflector. The second light beam reflected by the reflector and the first light beam reflected or scattered by the test object will interfere with each other to form interference patterns for measuring the test object.

6 Claims, 14 Drawing Sheets

SCAN LENS, INTERFEROMETRIC MEASURING DEVICE USING SAME

BACKGROUND OF THE INVENTION

1. Technical Field

The present invention is relative to a scan lens and more particularly to an interferometric measurement device with the scan lens for measuring a test object.

2. Description of the Prior Art

Interferometric measuring device is an instrument that uses interference patterns formed by a reference beam and an object beam to establish the contours and depth reflection or scattering intensity information of the object under test. Interferometric measuring devices are widely used to scan electronic circuits, optical masks and human tissues, like the application of an optical coherence tomography. FIG. 1 illustrates a conventional interferometric measuring device 10, which comprises a coherent light source module 11, a collimator 12, a beam splitter 13 (for example, beam-splitting mirror), a lens 14, a reflective mirror 15, and a spectrometer 16. The coherent light source module 11 is adapted to generate a coherent light beam I. The collimator 12 is adapted to make the light rays of the coherent light beam I parallel.

The beam splitter 13 is adapted to split the collimated coherent light beam I, thereby generating a reference beam Ir and an object beam Io, wherein the reference beam Ir is projected onto the reflective mirror 15, and the object beam Io is focused by the lens 14 onto the test object 17. The reference beam Ir will be reflected by the reflective mirror 15 to pass through the beam splitter 13 and then to fall upon the spectrometer 16. The object beam Io will be scattered or reflected by the test object 17 and then reflected by the beam splitter 13 onto the spectrometer 16. After falling upon the spectrometer 16, due to optical path difference, the object beam Io and the reference beam Ir will form interference patterns. Thus, the spectrometer 16 can analyze the interference patterns to estimate the contours and structure of the test object 17.

However, the aforesaid prior art interferometric measuring device 10 has a long optical path, not conducive to reduction of the dimension of the interferometric measuring device 10. Further, the interferometric measuring device 10 can simply uses a coherent light source module 11. If a low coherence light source is used, it can cause dispersion problems and an optical path difference between the reference beam Ir and the object beam Io, leading to measurement errors.

SUMMARY OF THE PRESENT INVENTION

It is, therefore, the main objective of the present invention to provide a scan lens, which comprises a lens set, a beam splitter, and a reflector, wherein the reflector is set between the lens set and the beam splitter. A light beam that passes through the lens set is projected onto the beam splitter to split the light beam into a first light beam and a second light beam. The first light beam that passes through the beam splitter is projected onto the test object. The second light beam that is reflected by the beam splitter is projected onto the reflector. Thus, the first light beam that is reflected or scattered by the test object and the second light beam that is reflected by the reflector will interfere with each other at the beam splitter. By means of the use of the scan lens, the optical path during interferometric measurement is shortened, facilitating narrowing the size of the interferometric measuring device.

It is another objective of the present invention to provide a scan lens, which comprises a lens set, a beam splitter, a light transmission device and a light shade, wherein the light transmission device is set between the lens set and the beam splitter, and the light shade is mounted at the light transmission device. A light beam that passes through the lens set is projected onto the beam splitter to split the light beam into a first light beam and a second light beam. The first light beam that passes through the beam splitter is projected onto the test object. The second light beam that is reflected by the beam splitter is projected onto the light transmission device. A part of the second light beam will pass through the light transmission device, and then blocked or absorbed by the light shade. Another part of the second light beam will be reflected by the light transmission device onto the beam splitter. Thus, the first light beam that is reflected or scattered by the test object and the second light beam that is reflected by the transmission device will interfere with each other at the beam splitter. By means of the use of the scan lens, the optical path during interferometric measurement is shortened, facilitating narrowing the size of the interferometric measuring device.

It is still another objective of the present invention to provide an interferometric measuring device, which comprises a light source module, a scan lens and a sensor, wherein the light source module projects a light beam through the scan lens onto the test object. The scan lens splits the light beam into a first light beam and a second light beam. The first light beam that passes through the beam splitter is projected onto the test object. The second light beam that is reflected by the beam splitter is projected onto the reflector. The first light beam that is reflected or scattered by the test object and the second light beam that is reflected by the reflector will interfere with each other at the beam splitter, enabling the interferometric measuring device to measure the structure of the test object.

To achieve these and other objectives of the present invention, the present invention provides a scan lens, comprising: a lens set; beam splitter adapted to split a light beam passing through the lens set into a first light beam and a second light beam, wherein the first light beam passes through the beam splitter and the second light beam is reflected by the beam splitter; and a reflector disposed between the lens set and the beam splitter and adapted to receive the second light beam that is reflected by the beam splitter and to reflect the received the light beam onto the beam splitter.

The present invention provides another scan lens, comprising: a lens set; a beam splitter adapted to split a light beam passing through the lens set into a first light beam and a second light beam, wherein the first light beam passes through the beam splitter and the second light beam is reflected by the beam splitter; a light transmission device disposed between the lens set and the beam splitter and adapted to receive the second light beam that is reflected by the beam splitter, enabling one part of the second light beam to be partially reflected by the light transmission device onto the beam splitter and one other part of the second light beam to pass through the light transmission device; and a light shade mounted at the light transmission device and adapted to shade or absorb the second light beam that passes through the light transmission device.

The present invention provides an interferometric measuring device, comprising: a light source module adapted to generate a light beam; a scan lens adapted to receive the light beam, the scan lens comprising: a lens set adapted to change the focus position of the light beam; a beam splitter adapted to split the light beam into a first light beam and a second light beam, wherein the first light beam passes through the beam splitter and falls upon a test object and the second light beam is reflected by the beam splitter; and a reflector disposed between the lens set and the beam splitter and adapted to receive the second light beam that is reflected by the beam splitter and to reflect the second light beam onto the beam splitter; and a sensor adapted to receive the first light beam that is scattered or reflected by the test object and the second light beam that is reflected by the reflector.

The present invention provides another interferometric measuring device, comprising: a light source module adapted to generate a light beam; a scan lens adapted to receive the light beam, the scan lens comprising: a lens set adapted to change the focus position of the light beam; a beam splitter adapted to split the light beam into a first light beam and a second light beam, wherein the first light beam passes through the beam splitter and falls upon a test object and the second light beam is reflected by the beam splitter; a light transmission device disposed between the lens set and the beam splitter and adapted to receive the second light beam that is reflected by the beam splitter, enabling one part of the second light beam to be partially reflected by the light transmission device onto the beam splitter and one other part of the second light beam to pass through the light transmission device; and a light shade mounted at the light transmission device and adapted to shade or absorb the second light beam that passes through the light transmission device; and a sensor adapted to receive the first light beam that is scattered or reflected by the test object and the second light beam that is reflected by the reflector.

In one embodiment of the scan lens, further comprises a light transmission device disposed between the lens set and the beam splitter and the reflector mounted at the light transmission device.

In one embodiment of the scan lens, the light transmission device defines a first surface and a second surface, wherein the first surface faces toward the lens set, the second surface faces toward the beam splitter, and the reflector is mounted at the second surface of the light transmission device.

In one embodiment of the scan lens, further comprises a connector disposed between the lens set and the beam splitter, wherein the connector comprises a first connection unit and a second connection unit, the light transmission device and the reflector are mounted at the first connection unit, and the beam splitter is mounted at the second connection unit.

In one embodiment of the scan lens, the light transmission device defines a first surface and a second surface, wherein the first surface faces toward the lens set, the second surface faces toward the beam splitter, and the light shade is mounted at the first surface of the light transmission device.

In one embodiment of the scan lens, further comprises a connector disposed between the lens set and the beam splitter, wherein the connector comprises a first connection unit and a second connection unit, the light transmission device and the light shade are mounted at the first connection unit, and the beam splitter is mounted at the second connection unit.

In one embodiment of the interferometric measuring device, further comprises at least one scan mirror disposed between the scan lens and the light source module and adapted to receive the light beam generated by the light source module and to change the falling location or angle of the first light beam and the second light beam.

In one embodiment of the interferometric measuring device, further comprises an adjustment device connected to the scan lens and adapted to adjust the distance between the scan lens and the test object.

In one embodiment of the interferometric measuring device, further comprises a polarization beam splitter disposed between the light source module and the scan lens, and adapted to guide the first light beam that is scattered or reflected by the test object and the second light beam that is reflected by the reflector and the beam splitter to the sensor.

In one embodiment of the interferometric measuring device, further comprises a light transmission device disposed between the lens set and the beam splitter, wherein the reflector is mounted at the light transmission device.

In one embodiment of the interferometric measuring device, the light transmission device defines a first surface and a second surface, the first surface faces toward the lens set, the second surface faces toward the beam splitter, and the reflector is mounted at the second surface of the light transmission device.

In one embodiment of the interferometric measuring device, further comprises a compensative light transmission device disposed between the test object and the beam splitter.

In one embodiment of the interferometric measuring device, the transmission device defines a first surface and a second surface, the first surface faces toward the lens set, the second surface faces toward the beam splitter, and the light shade is mounted at the first surface of the light transmission device.

In one embodiment of the interferometric measuring device, further comprises a compensative light transmission device disposed between the test object and the beam splitter.

Other advantages and features of the present invention will be fully understood by reference to the following specification in conjunction with the accompanying drawings, in which like reference signs denote like components of structure.

DETAILED DESCRIPTION OF THE PREFERRED EMBODIMENTS

Figure 2:
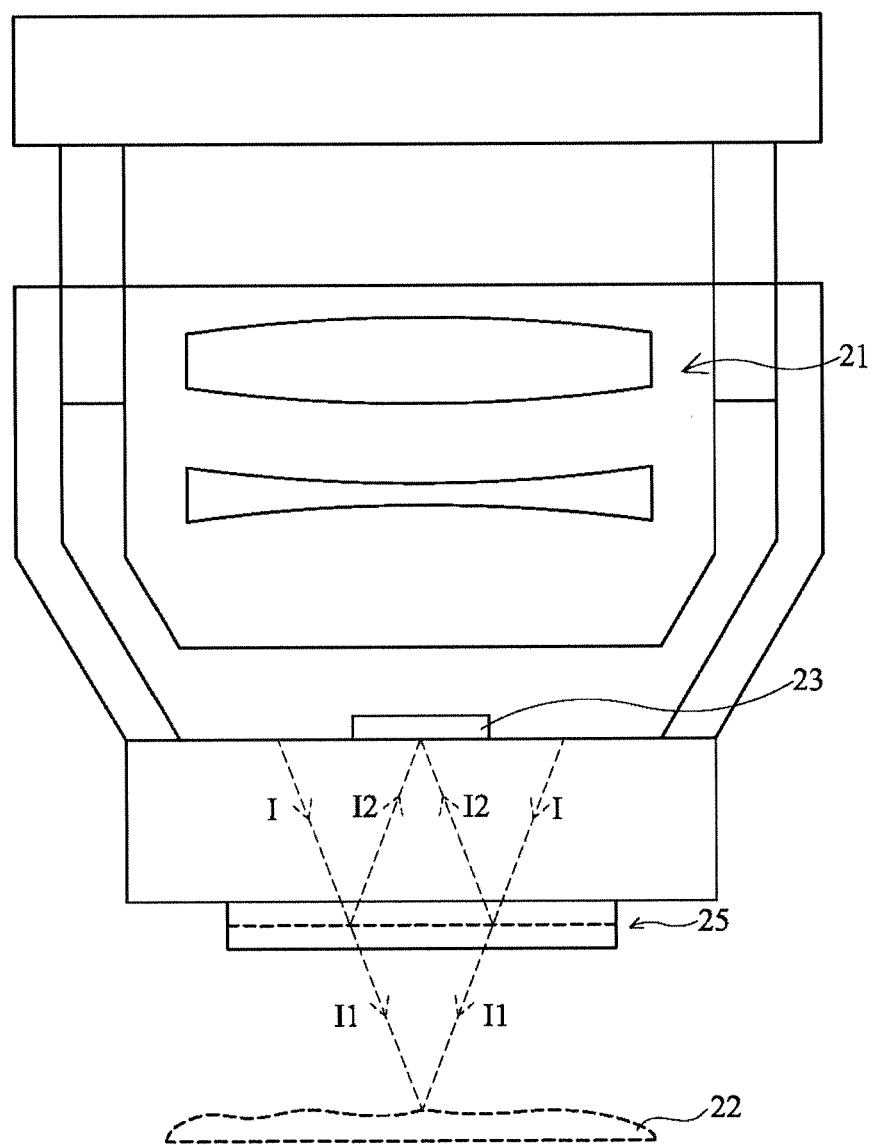
FIG. 2 is a schematic drawing illustrating the architecture of a scan lens in accordance with a first embodiment of the present invention.

Please refer to FIG. 2, a scan lens in accordance with a first embodiment of the present invention is shown. As illustrated, the scan lens 20 comprises a lens set 21, a reflector 23, and a beam splitter 25, wherein the reflector 23 is set between the lens set 21 and the beam splitter 25.

During application, the applied light beam I passes through the lens set 21 where the lens set 21 changes the focus position of the light beam I. After passed through the lens set 21, the light beam I falls upon the beam splitter 25 for splitting. At this time, a part of the light beam I passes through the beam splitter 25, and another part of the light beam I is reflected by the beam splitter 25. In one embodiment, the part of the light beam I that passes through the beam splitter 25 is defined as a first light beam I1, and the part of the light beam I that reflected by the beam splitter 25 is defined as a second light beam I2.

The reflector 23 is disposed between the lens set 21 and the beam splitter 25. Thus, when the light beam I is being projected onto the beam splitter 25, a part of the light beam I will be blocked by the reflector 23 from falling upon the beam splitter 25.

In one embodiment, the first light beam I1, after passed through the beam splitter 25, can be projected onto a test object 22 that can scatter and/or reflect the first light beam I1, causing the first light beam I1 to fall upon and pass through the beam splitter 25.

After reflected by the beam splitter 25, the second light beam I2 is projected onto the reflector 23, which then reflects the falling second light beam I2 onto the beam splitter 25. The beam splitter 25 will further reflect the second light beam I2 delivered by the reflector 23. The second light beam I2 reflected by the beam splitter 25 will interfere with the first light beam I1 that is scattered and/or reflected by the test object 22.

Figure 3:
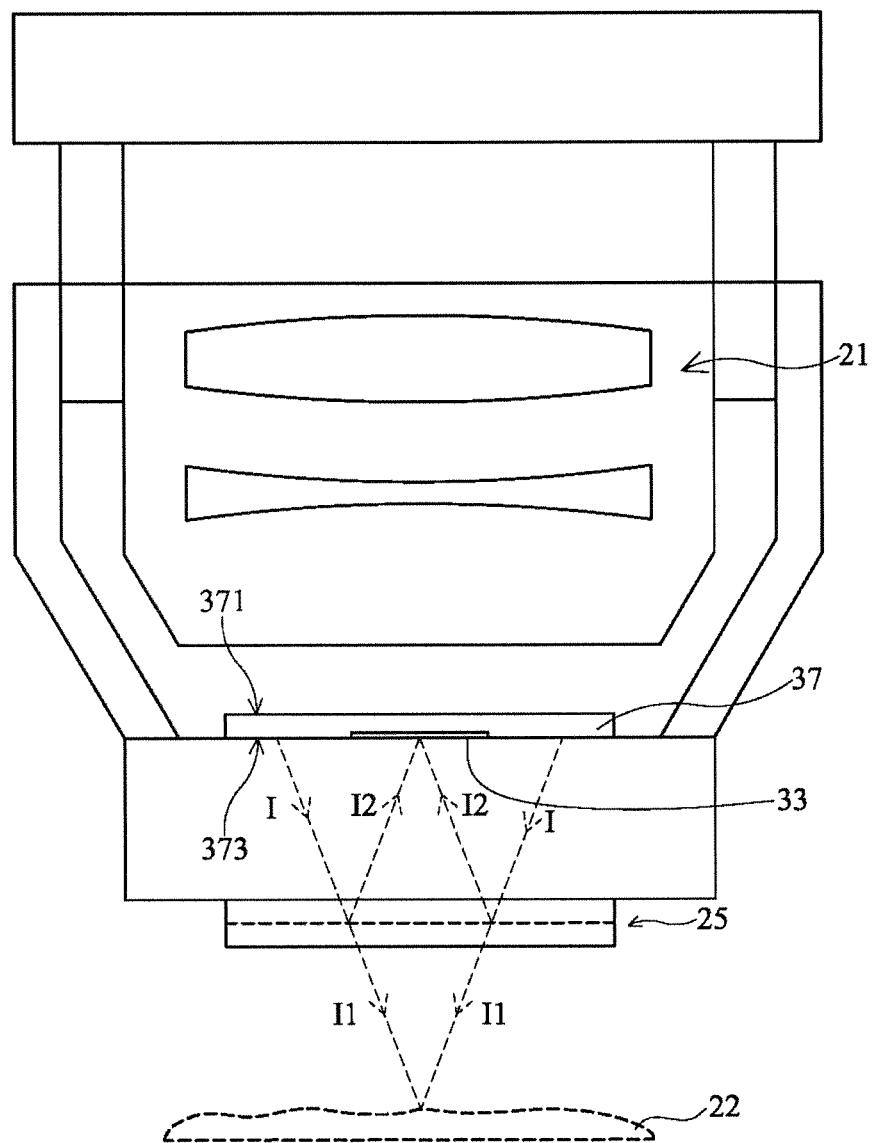
FIG. 3 is a schematic drawing illustrating the architecture of a scan lens in accordance with a second embodiment of the present invention.

Referring to FIG. 3, a scan lens in accordance with a second embodiment of the present invention is shown. As illustrated, the scan lens 30 comprises a lens set 21, a light transmission device 37, a reflector 33, and a beam splitter 25, wherein the light transmission device 37 is set between the lens set 21 and the beam splitter 25, and the reflector 33 is located on the light transmission device 37.

In this embodiment, the reflector 33 can be a thin film, for example, metal thin film selected from the group of aluminum, silver, aluminum-silver alloys and gold, and covered on the surface of the light transmission device 37. In one embodiment, the light transmission device 37 defines a first surface 371 and a second surface 373. The first surface 371 faces toward the lens set 21. The second surface 373 faces toward the beam splitter 25. The reflector 33 is mounted at the second surface 373 of the light transmission device 37.

The reflector 33 is disposed between the lens set 21 and the beam splitter 25. When the applied light beam I is being projected onto the beam splitter 25, a part of the light beam I will be blocked by the reflector 33 from being projected onto the beam splitter 25.

In this embodiment, the first light beam I1, after passed through the beam splitter 25, is projected onto a test object 22, which will then scatter and/or reflect the first light beam I1, enabling the first light beam I1 to fall upon and pass through the beam splitter 25.

The second light beam I2, after having been reflected by the beam splitter 25, will fall upon the reflector 33 that will further reflect the second light beam I2 onto the beam splitter 25. The second light beam I2 reflected by the reflector 33 onto the beam splitter 25 will interfere with the first light beam I1 that is scattered and/or reflected by the test object 22.

Figure 3A:
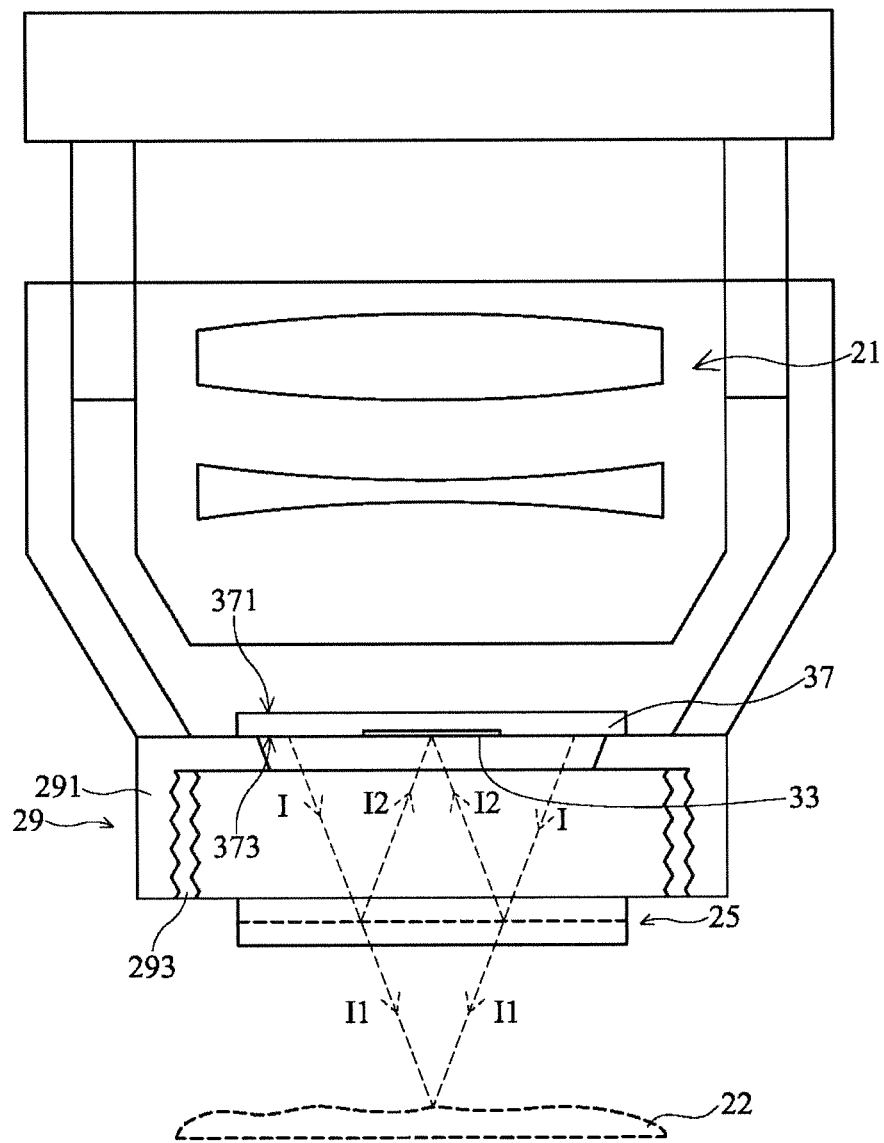
FIG. 3A illustrates an alternate form of the scan lens in accordance with the second embodiment of the present invention.

In one embodiment, referring to FIG. 3A, the scan lens 30 comprises a connector 29 disposed between the lens set 21 and the beam splitter 25. In one example of the present invention, the connector 29 comprises a first connection unit 291 and a second connection unit 293. Further, the first connection unit 291 and the second connection unit 293 are interlockable. The reflector 33 and the light transmission device 37 are mounted at the first connection unit 291. The beam splitter 25 is mounted at the second connection unit 293. In actual application, the user can detach the second connection unit 293 and the beam splitter 25 from the first connection unit 291, and then install a beam splitter 25 of a different splitting ratio as a substitute for measuring a different test object 22.

Figure 3B:
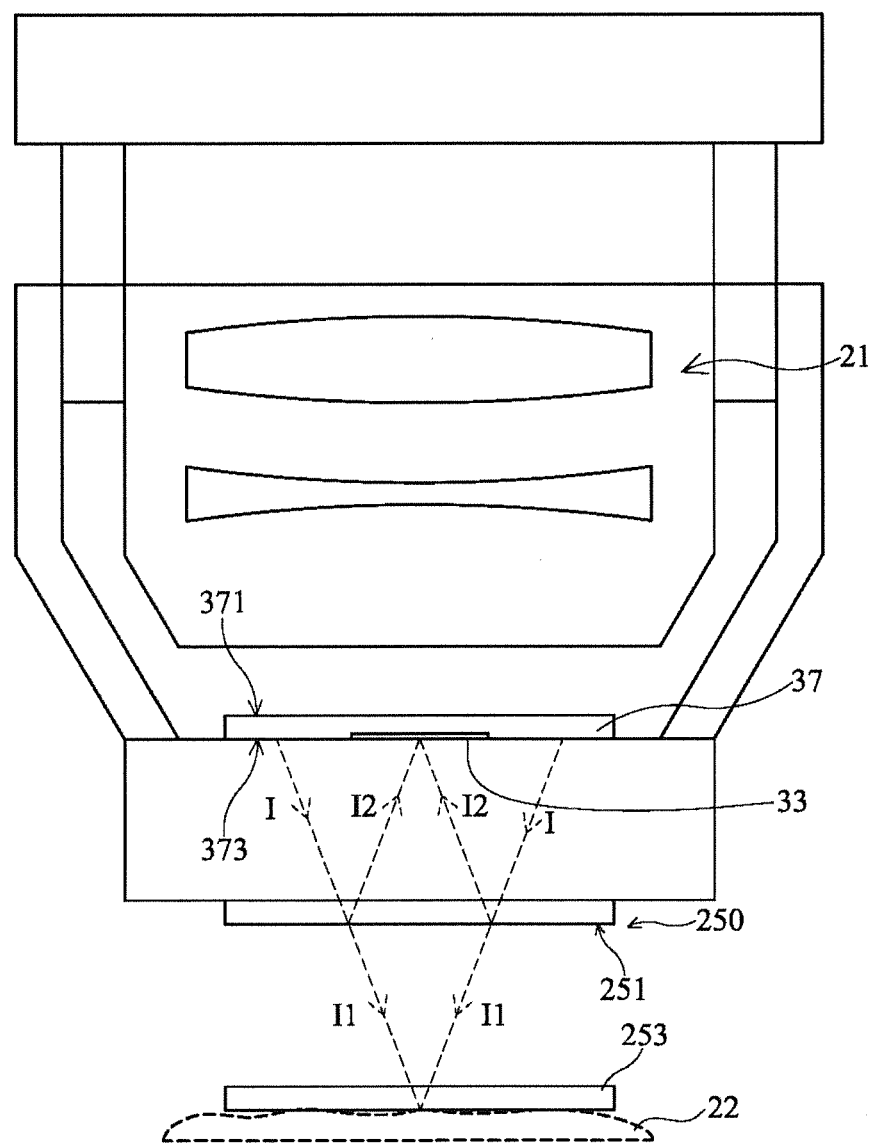
FIG. 3B is a schematic drawing illustrating an application status of the scan lens in accordance with the second embodiment of the present invention.

In one embodiment, referring to FIG. 3B, the applied light beam I will be split at the surface 251 of the beam splitter 250 that is in contact with the atmosphere. At this time, the part of the light beam I that passes through the surface 251 of the beam splitter 250 is defined as a first light beam I1, and the part of the light beam I that reflected by the surface 251 of the beam splitter 250 is defined as a second light beam I2. In order to compensate the light path of the first light beam I1, a compensative light transmission device 253 is set between the test object 22 and the beam splitter 25. The compensative light transmission device 253 can be covered on the test object 22. Further, the compensative light transmission device 253 and the beam splitter 250 have the same light path and/or thickness, so that the first light beam I1 and the second light beam I2 can have a similar light path.

Figure 4:
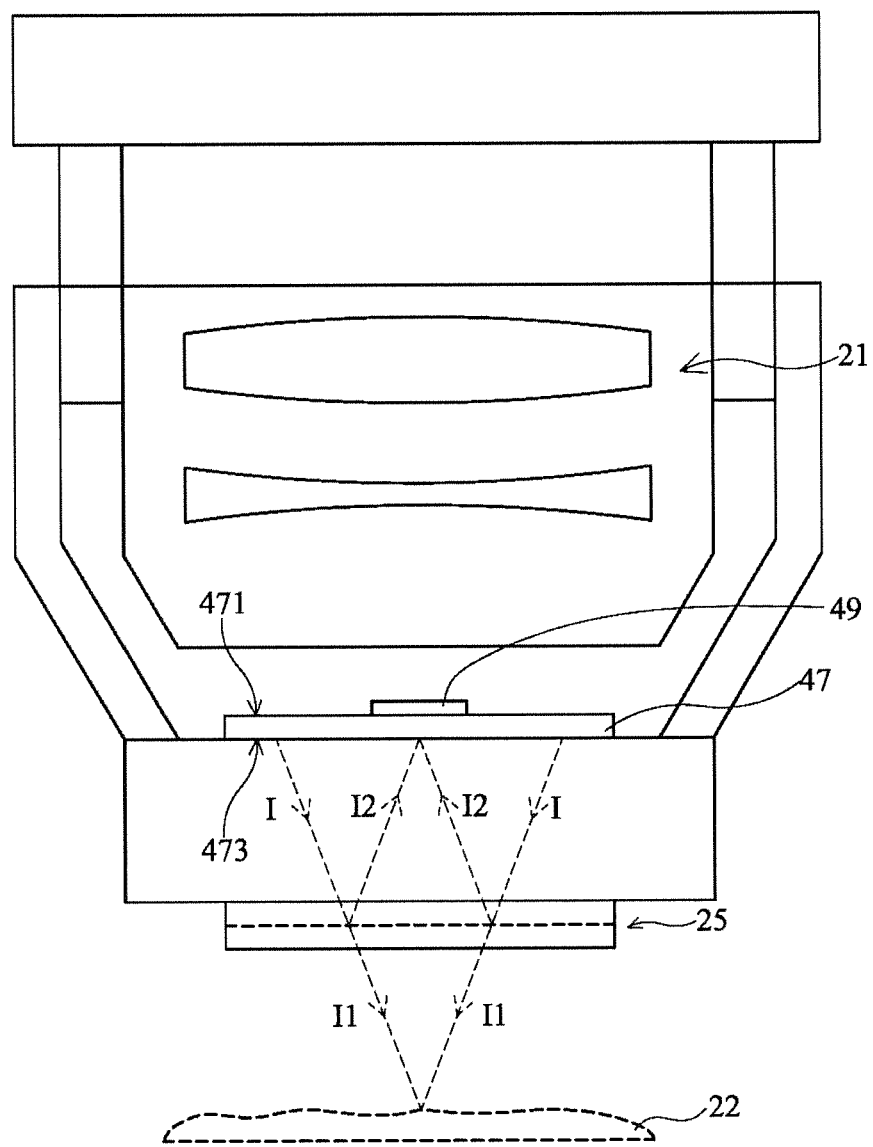
FIG. 4 is a schematic drawing illustrating the architecture of a scan lens in accordance with a third embodiment of the present invention.

Referring to FIG. 4, a scan lens in accordance with a third embodiment of the present invention is shown. As illustrated, the scan lens 40 comprises a lens set 21, a light transmission device 47, a light shade 49, and a beam splitter 25, wherein the light transmission device 47 is set between the lens set 21 and the beam splitter 25, and the light shade 49 is located on the light transmission device 47.

The light transmission device 47 comprises a first surface 471 and a second surface 473, wherein the first surface 471 faces toward the lens set 21, and the second surface 473 faces toward the beam splitter 25. The light shade 49 is arranged on the first surface 471 of the light transmission device 47.

In actual application, the applied light beam I passes through the lens set 21 and the light transmission device 47 to fall upon the beam splitter 25. Because the light shade 49 is disposed between the lens set 21 and the beam splitter 25, the light shade 47 will block a part of the light beam I when the light beam I is being projected onto the beam splitter 25.

In one embodiment, the first light beam I1 that passed through the beam splitter 25 can be projected onto a test object 22, which will scatter and/or reflect the first light beam I1, causing the first light beam I1 to fall upon and to pass through the beam splitter 25.

Due to different transmittance between the light transmission device 47 and the neighbor medium, when a light source is projected onto the light transmission device 47, a part of the light source will pass through the light transmission device 47, and another part of the light source will be reflected by the light transmission device 47. When the second light beam I2 is reflected by the beam splitter 25 onto the second surface 473 of the light transmission device 47, a part of the second light beam I2 will enter the light transmission device 47, and another part of the second light beam I2 will be reflected by the second surface 473 of the light transmission device 47.

The part of the second light beam I2 that entered the light transmission device 47 will be blocked or absorbed by the light shade 49. The part of the second light beam I2 that is reflected by the second surface 473 of the light transmission device 47 will be projected onto the beam splitter 25. The second light beam I2 that is reflected by the second surface 473 of the light transmission device 47 will interfere with the first light beam I1 that is scattered and/or reflected by the test object 22.

Further, in this embodiment, a thin film can be covered on the second surface 473 of the light transmission device 47 to regulate the ratio of the second light beam I2 between the part that passes through the second surface 473 into the light transmission device 47 and the part that is reflected by the second surface 473 of the light transmission device 47.

Figure 4A:
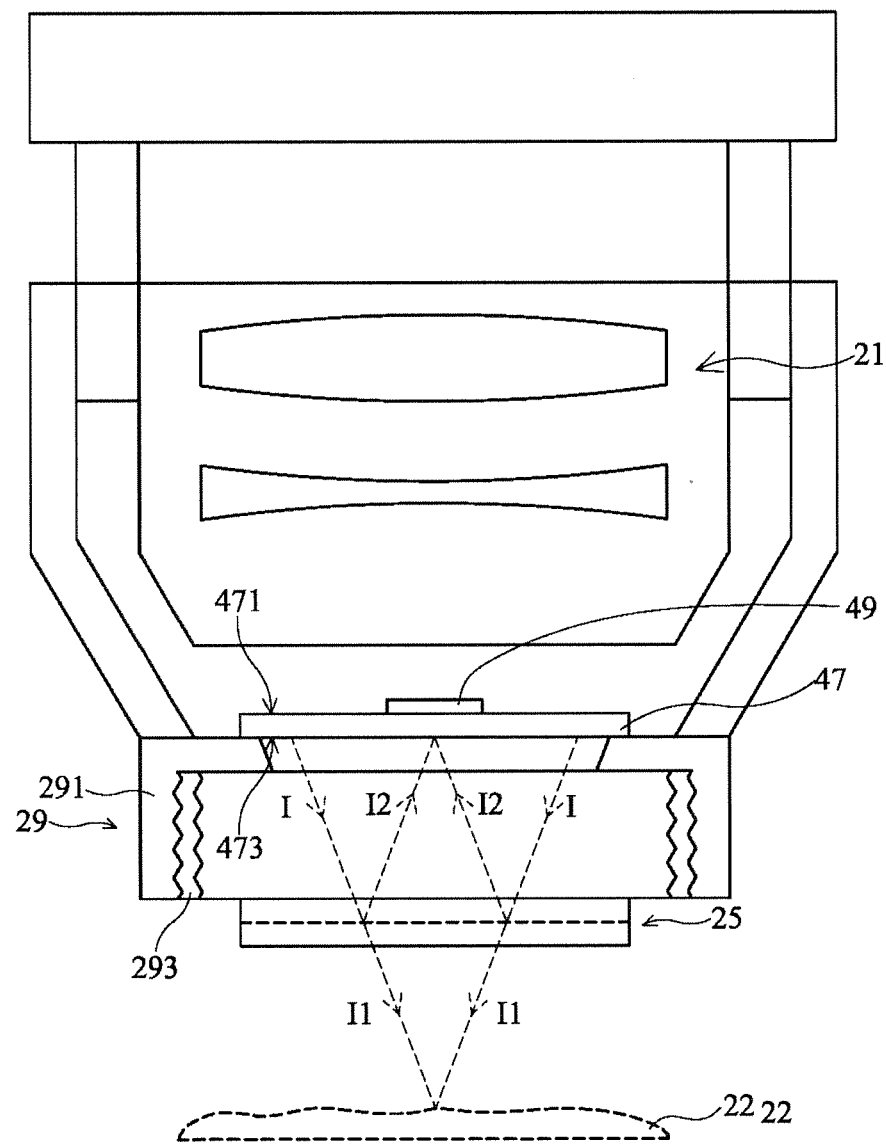
FIG. 4A illustrates an alternate form of the scan lens in accordance with the third embodiment of the present invention.

In an alternate form of this embodiment, as shown in FIG. 4A, the scan lens 40 further comprises a connector 29 disposed between the lens set 21 and the beam splitter 25. In one example of the present invention, the connector 29 comprises a first connection unit 291 and a second connection unit 293. The first connection unit 291 and the second connection unit 293 are interlockable. Further, the light transmission device 47 and the light shade 49 are arranged on the first connection unit 291. The beam splitter 25 is mounted at the second connection unit 293. In actual application, the user can detach the second connection unit 293 and the beam splitter 25 from the first connection unit 291, and then install a beam splitter 25 of a different splitting ratio as a substitute for measuring a different test object 22.

Figure 4B:
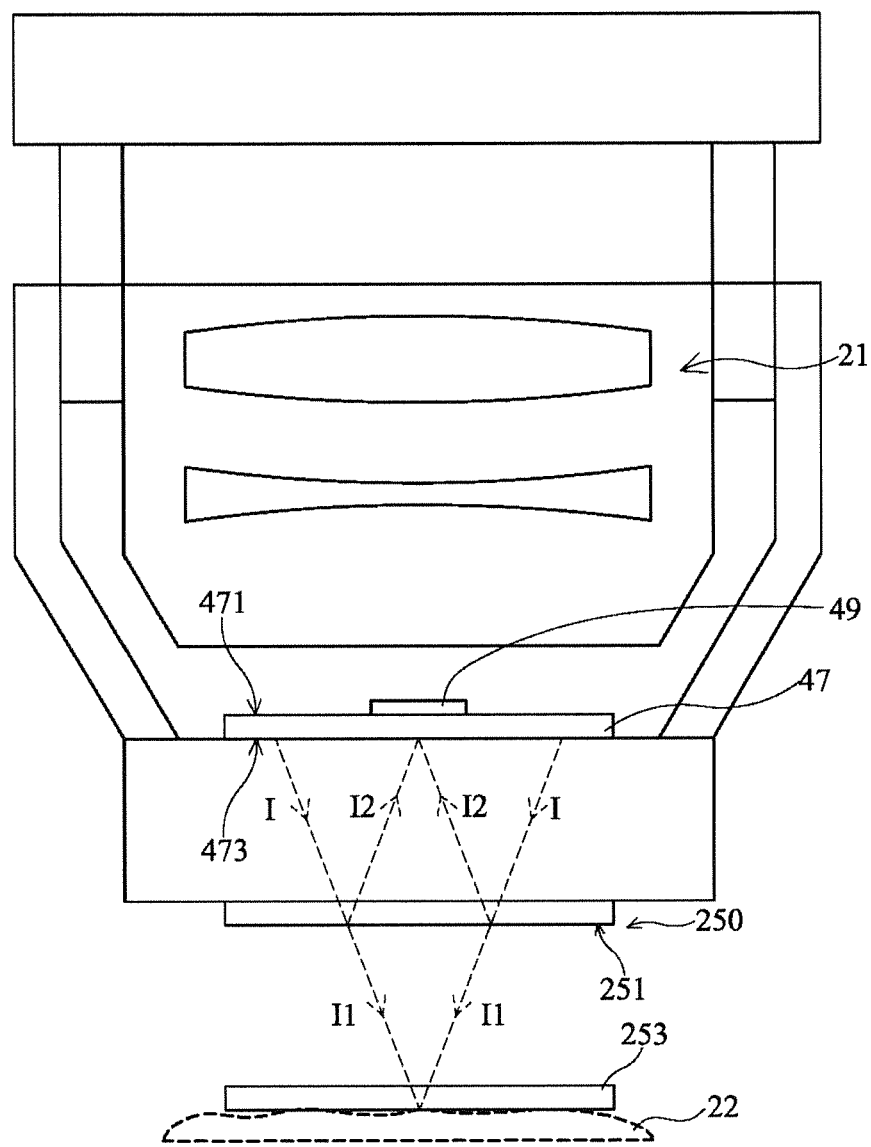
FIG. 4B is a schematic drawing illustrating an application status of the scan lens in accordance with the third embodiment of the present invention.

Referring to FIG. 4B, the applied light beam I will be split at the surface 251 of the beam splitter 250 that is in contact with the atmosphere. At this time, the part of the light beam I that passes through the surface 251 of the beam splitter 250 is defined as a first light beam I1, and the part of the light beam I that reflected by the surface 251 of the beam splitter 250 is defined as a second light beam I2. In order to compensate the light path of the first light beam I1, a compensative light transmission device 253 is set between the test object 22 and the beam splitter 25. The compensative light transmission device 253 can be covered on the test object 22. Further, the compensative light transmission device 253 and the beam splitter 250 have the same light path and/or thickness, so that the first light beam I1 and the second light beam I2 can have a similar light path.

Figure 5A:
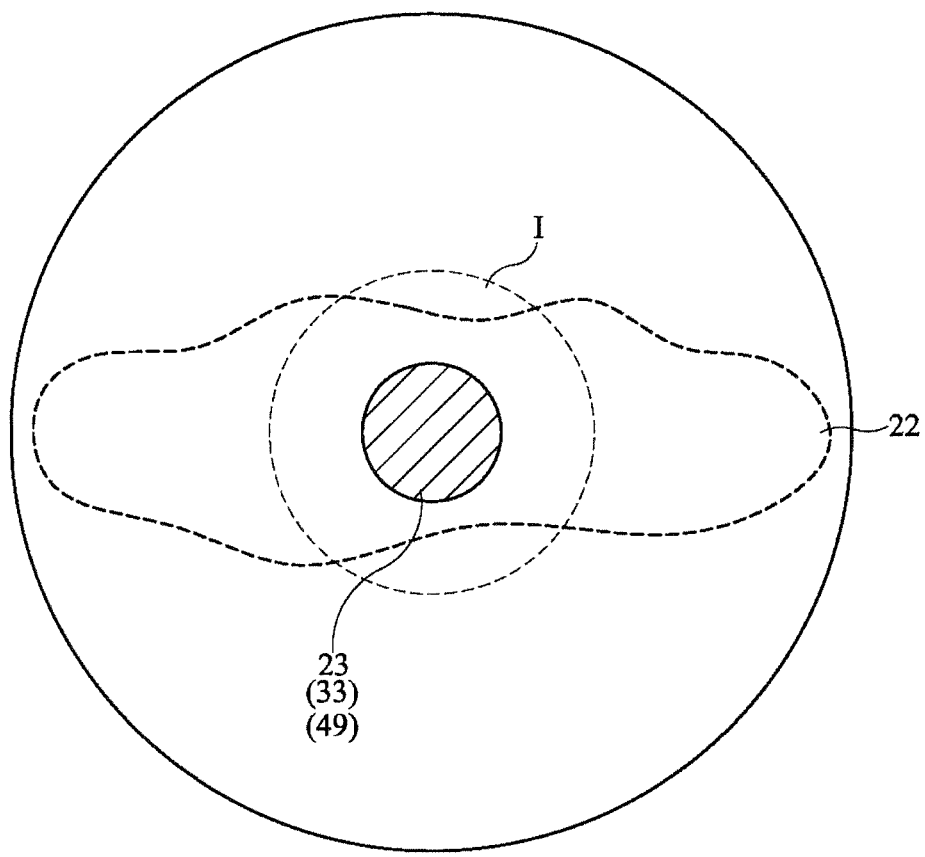
FIGS. 5A-5C illustrate examples of the reflector and light shade of the scan lens in accordance with the present invention.
Figure 5B:
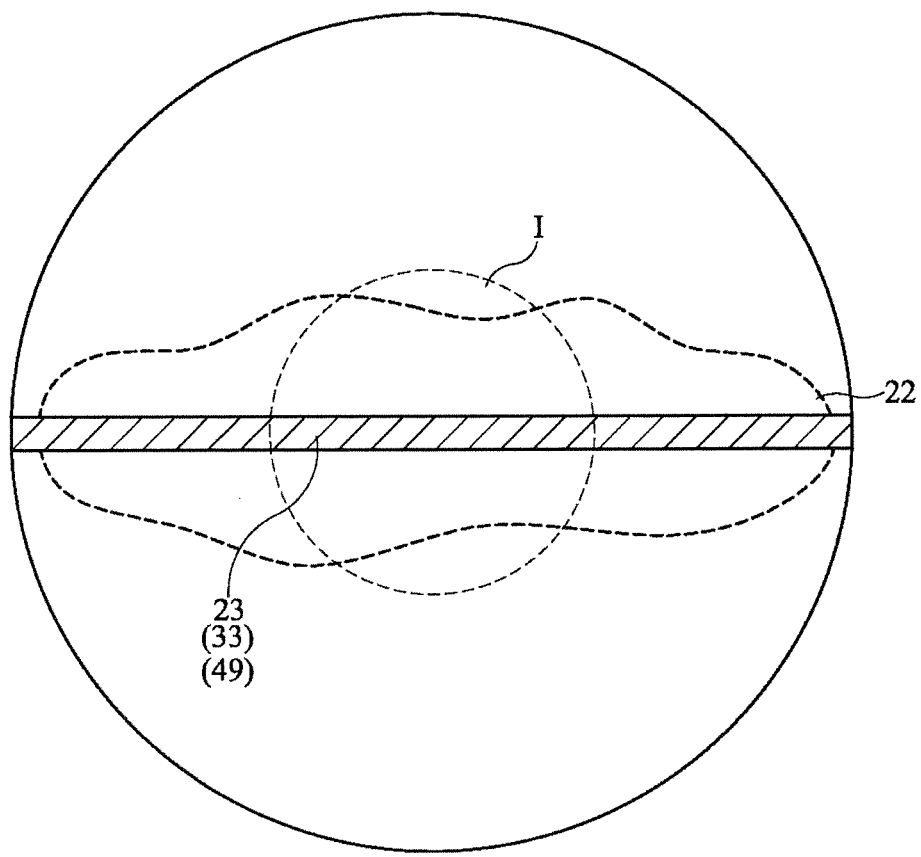
Figure 5C:
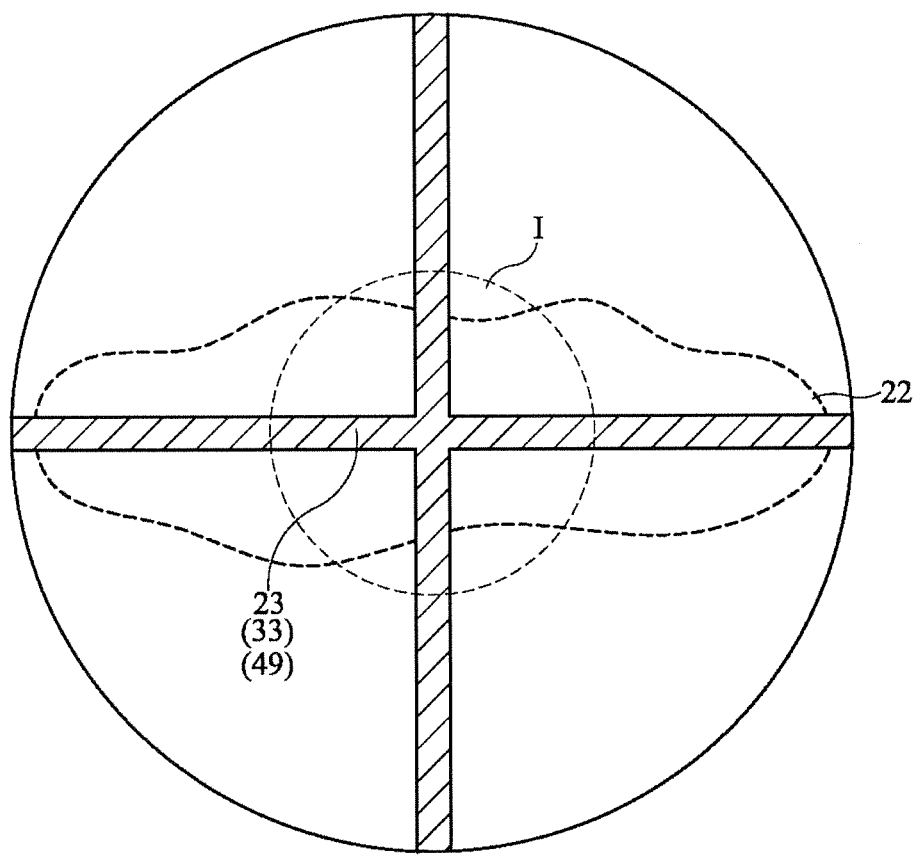

The reflector 23/33 of the aforesaid scan lens 20/30 can be shaped like a strip, cross, circle or polygon, or made in any of a variety of other geometric shapes, as shown in FIGS. 5A, 5B and 5C, and arranged to shade a part of the light beam I and to reflect the second light beam I2. Further, the light shade 49 of the scan lens 40 can also be shaped like a strip, cross, circle or polygon, or made in any of a variety of other geometric shapes, as shown in FIGS. 5A, 5B and 5C, and arranged to shade and/or absorb a part of the light beam I and the second light beam I2.

Figure 6:
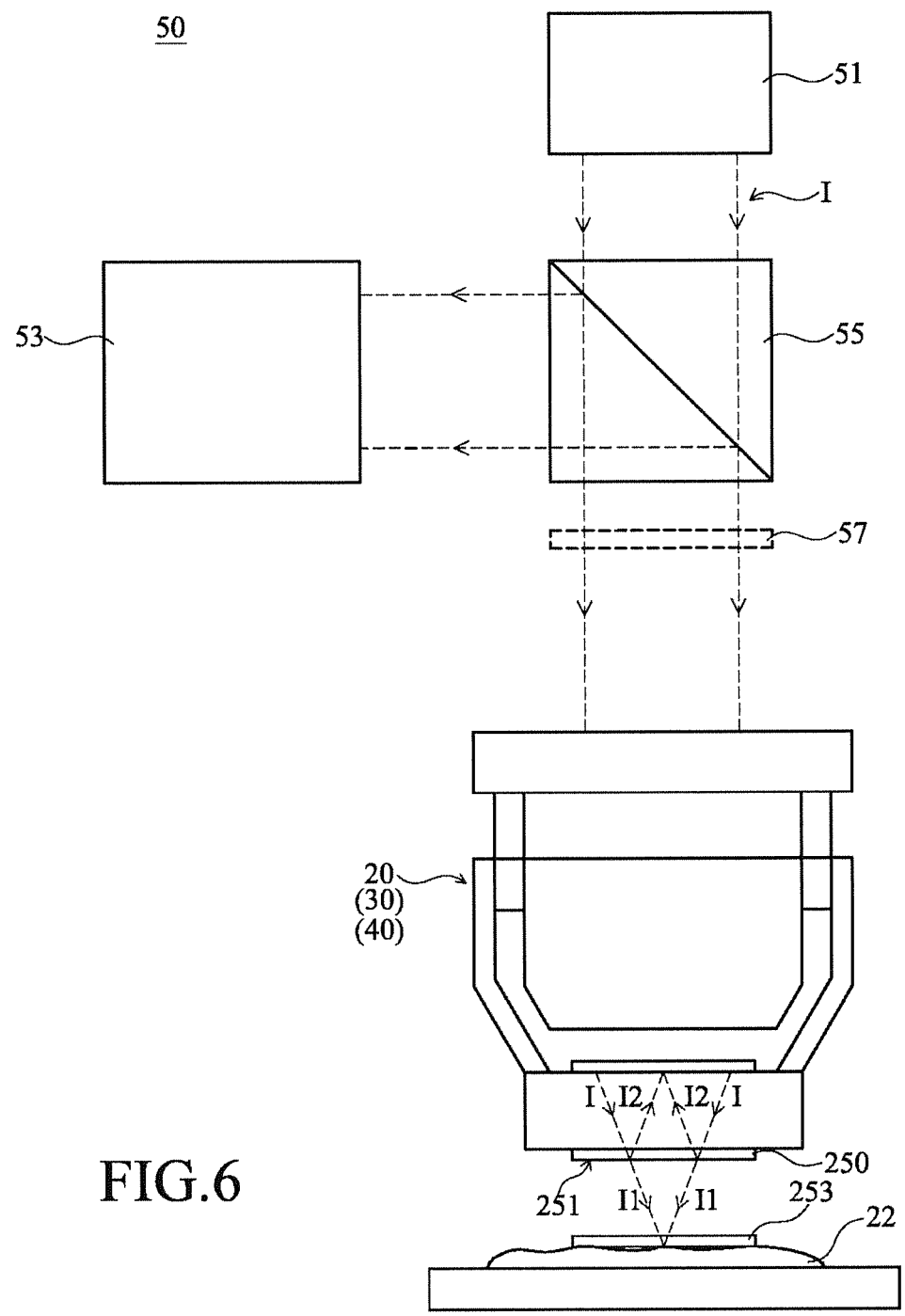
FIG. 6 is a schematic drawing illustrating the architecture of an interferometric measuring device in accordance with a first embodiment of the present invention.

Referring to FIG. 6, an interferometric measuring device in accordance with a first embodiment of the present invention is shown. As illustrated, the interferometric measuring device 50 is adapted to measure a test object 22, and comprises a light source module 51, a scan lens 20/30/40 and a sensor 53.

The light source module 51 is adapted to generate a light beam I and to project the generated light beam I onto the scan lens 20/30/40. The structure of the scan lens 20/30/40 can be configured subject to either of FIGS. 2-4. The light beam I can pass through the lens set 21 that adjusts and changes the focus position of the light beam I. After passed through the lens set 21, the light beam I will be projected onto the beam splitter 25. When the light beam I passes through the lens set 21 toward the beam splitter 25, a part of the light beam I will be blocked by the reflector 23/33 or the light shade 49, and the part of the light beam I that is not blocked by the reflector 23/33 or the light shade 49 will fall upon the beam splitter 25.

When the light beam I falls upon the beam splitter 25, a part of the light beam I will pass through the beam splitter 25 to form a first light beam I1, and another part of the light beam I will be reflected by the beam splitter 25 to form a second light beam I2. The first light beam I1 will be projected onto the test object 22. The second light beam I2 will be projected onto the reflector 23/33 or the light transmission device 47 between the lens set 21 and the beam splitter 25.

The test object 22 will reflect or scatter the first light beam I1, causing a reflected or scattered part of the first light beam I1 to fall upon the beam splitter 25 and to pass through the beam splitter 25. The reflector 23/33 or the light transmission device 47 will reflect the second light beam I2. The reflected second light beam I2 will be projected onto the beam splitter 25, and then reflected by the beam splitter 25.

Figure 1:
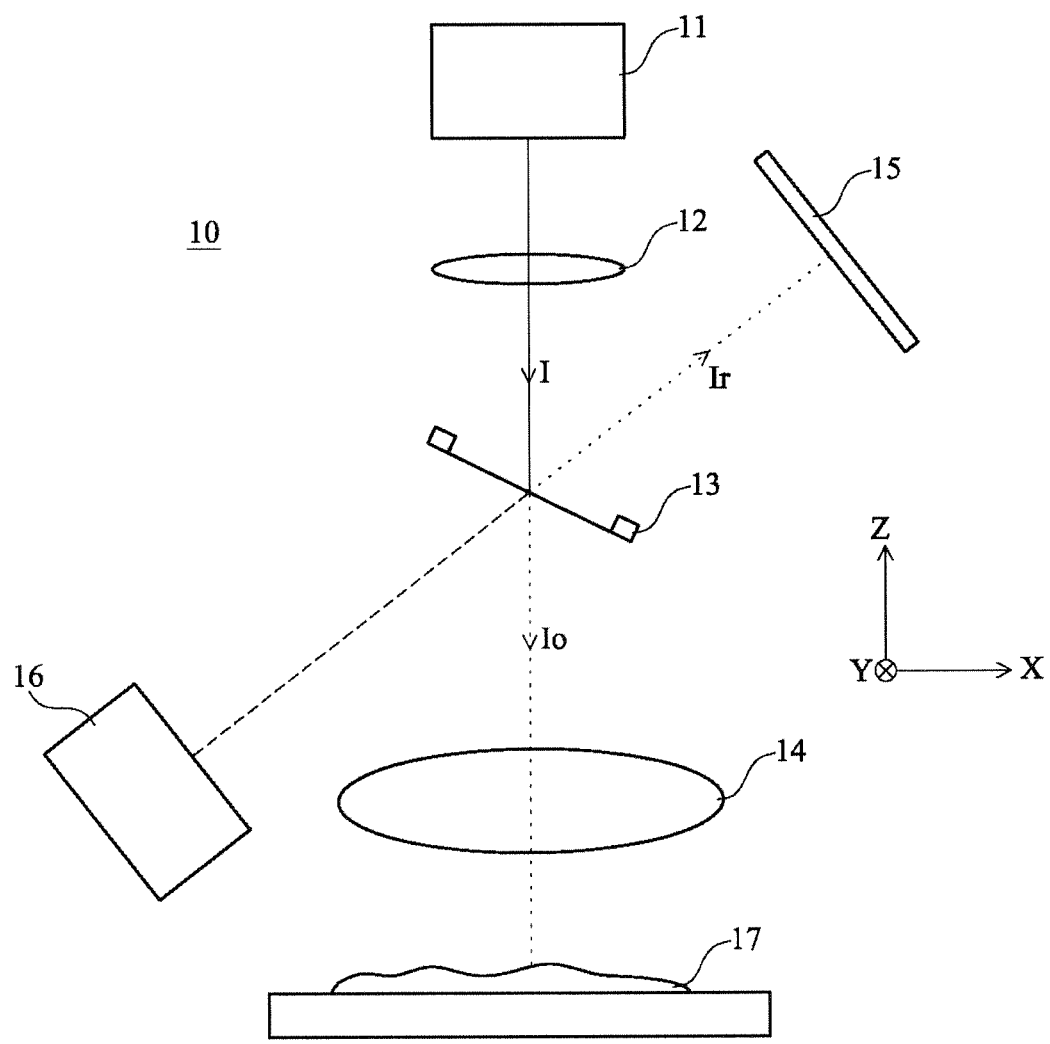
FIG. 1 is a schematic drawing illustrating the architecture of an interferometric measuring device according to the prior art.

The first light beam I1 that is reflected or scattered by the test object 22 and the second light beam I2 that is reflected by the reflector 23/33 or the light transmission device 47 will be guided to the sensor 53. In this embodiment, the first light beam I1 that is reflected or scattered by the test object 22 is same as the object beam Io in the prior art design (see FIG. 1), and the second light beam I2 that is reflected by the reflector 23/33 or the light transmission device 47 is the reference beam Ir. The first light beam I1 reflected or scattered by the test object 22 and the second light beam I2 reflected by the reflector 23/33 or the light transmission device 47 will interfere with each other due to a light path difference, thereby forming interference patterns. The sensor 53 receives the first light beam I1 reflected or scattered by the test object 22 and the second light beam I2 reflected by the reflector 23/33 or the light transmission device 47, and analyzes the interference patterns to estimate the contour and structure of the test object 22.

In one embodiment, the light beam I will be split at the surface 251 of the beam splitter 250 that is in contact with the atmosphere. At this time, the part of the light beam I that passes through the surface 251 of the beam splitter 250 is defined as a first light beam I1, and the part of the light beam I that reflected by the surface 251 of the beam splitter 250 is defined as a second light beam I2. In order to compensate the light path of the first light beam I1, a compensative light transmission device 253 is set between the test object 22 and the beam splitter 25. The compensative light transmission device 253 can be covered on the test object 22. Further, the compensative light transmission device 253 and the beam splitter 250 have the same light path and/or thickness, so that the first light beam I1 and the second light beam I2 can have a similar light path.

In one embodiment, a polarization beam splitter 55 and a wave plate 57 are arranged between the light source module 51 and scan lens 20/30/40 and the sensor 53, wherein the light beam I generated by the light source module 51 will pass through the polarization beam splitter 55 and the wave plate 57 and then fall upon the scan lens 20/30/40, and the first light beam I1 reflected or scattered by the test object 22 and the second light beam I2 reflected by the reflector 23/33 or the light transmission device 47 will be projected onto the polarization beam splitter 55 and the wave plate 57, and then guided by the polarization beam splitter 55 to the sensor 53.

Alternatively, the polarization beam splitter 55 can be a regular beam splitter, and thus, the wave plate 57 can be eliminated. The light beam I generated by the light source module 51 will pass through the beam splitter and fall upon the scan lens 20/30/40. The first light beam I1 reflected or scattered by the test object 22 and the second light beam I2 reflected by the reflector 23/33 or the light transmission device 47 will be projected onto the beam splitter 55, and then guided by the beam splitter 55 to the sensor 53.

Figure 7:
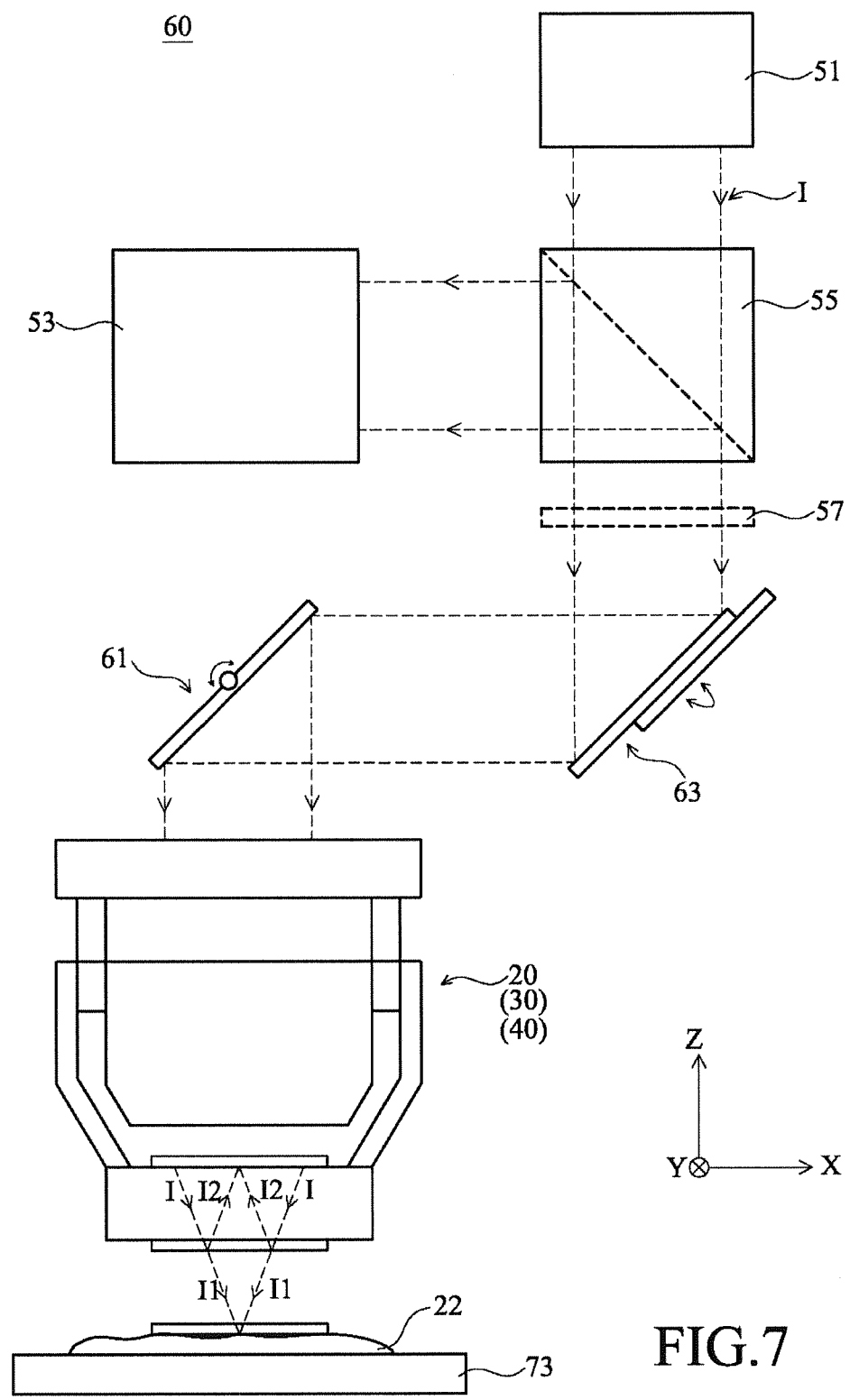
FIG. 7 is a schematic drawing illustrating the architecture of an interferometric measuring device in accordance with a second embodiment of the present invention.

Referring to FIG. 7, an interferometric measuring device in accordance with a second embodiment of the present invention is shown. As illustrated, the interferometric measuring device 60 is adapted to measure a test object 22, and comprises a light source module 51, a scan lens 20/30/40, at least one scan mirror 61/63 and a sensor 53.

The scan mirror 61/63 is disposed between light source module 51 and the scan lens 20/30/40. The light beam I generated by the light source module 51 will be projected onto the scan mirror 61/63. Through the scan mirror 61/63, the projecting angle and location of the light beam I at the scan lens 20/30/40 and/or the test object 22 are changed, and all locations at the test object 22 are scanned.

In one embodiment, the at least one scan mirror includes a first scan mirror 61 and a second scan mirror 63, wherein the first scan mirror 61 causes the light beam I to scan in a first direction X, and the second scan mirror 63 causes the light beam I to scan in a second direction Y. By means of the use of the first scan mirror 61 and the second scan mirror 63, the light beam I can perform two-dimensional scanning on the test object 22 to get two-dimensional images of the surface of the test object 22. In actual application, the number of the at least one scan mirror can be 1, for example, only the first scan mirror 61 or the second scan mirror 63 is installed.

Further, in this embodiment, a polarization beam splitter 55 and/or a wave plate 57 can be disposed between the light source module 51 and the at least one scan mirror 61/63, wherein the light beam I generated by the light source module 51 will pass through the polarization beam splitter 55 and/or the wave plate 57 and then fall upon the at least one scan mirror 61/63, and the first light beam I1 reflected or scattered by the test object 22 and the second light beam I2 reflected by the reflector 23/33 or the light transmission device 47 will be projected onto the polarization beam splitter 55 and/or the wave plate 57, and then guided by the polarization beam splitter 55 and/or the wave plate 57 to the sensor 53.

Alternatively, the polarization beam splitter 55 can be a regular beam splitter, and thus, the wave plate 57 can be eliminated. The light beam I generated by the light source module 51 will pass through the beam splitter and fall upon the scan mirror 61/63. The first light beam I1 reflected or scattered by the test object 22 and the second light beam I2 reflected by the reflector 23/33 or the light transmission device 47 will be projected onto the beam splitter 55, and then guided by the beam splitter 55 to the sensor 53.

Figure 8:
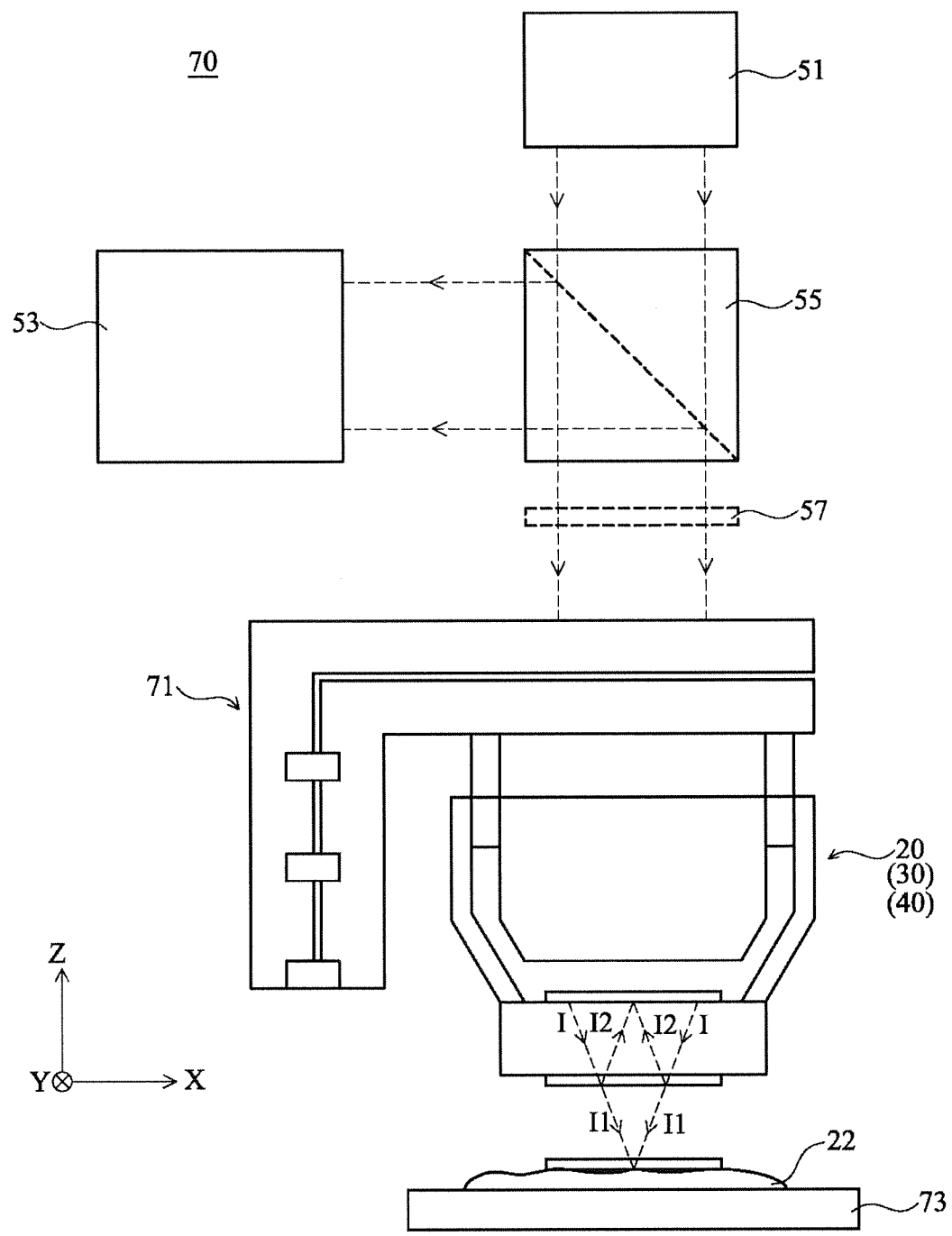
FIG. 8 is a schematic drawing illustrating the architecture of an interferometric measuring device in accordance with a third embodiment of the present invention.

Referring to FIG. 8, an interferometric measuring device in accordance with a third embodiment of the present invention is shown. As illustrated, the interferometric measuring device 70 is adapted to measure a test object 22, and comprises a light source module 51, a scan lens 20/30/40, an adjustment device 71 and a sensor 53.

The adjustment device 71 is connected to the scan lens 20/30/40, and adapted to adjust the distance between the scan lens 20/30/40 and the test object 22. Normally, when measuring the test object 22, the second light beam I2 will be focused on the surface of the test object 22 for measuring the structure of the surface of the test object 22. In this embodiment, the adjustment device 71 can be adjusted to carry the scan lens 20/30/40 along a third direction Z, enabling the focus of the second light beam I2 to fall on the surface or deep inside of the test object 22 for measuring the surface and internal structure of the test object 22.

In one embodiment, the interferometric measuring device 70 further comprises a movable platform 73, wherein the test object 22 is mounted at the movable platform 73 and movable with the movable platform 73 in the first direction X and the second direction Y to get 3-dimensional images of the test object 22.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A scan lens, comprising:
   a lens set;
   a beam splitter adapted to split a light beam passing through said lens set into a first light beam and a second light beam, wherein said first light beam passes through said beam splitter and said second light beam is reflected by said beam splitter;
   a light transmission device disposed between said lens set and said beam splitter and adapted to receive said second light beam that is reflected by said beam splitter, enabling one part of said second light beam to be partially reflected by said light transmission device onto said beam splitter and one other part of said second light beam to pass through said light transmission device; wherein said light transmission device defines a first surface and a second surface, said first surface faces toward said lens set, said second surface faces toward said beam splitter;
   a light shade fixedly mounted at said light transmission device and adapted to shade or absorb said second light beam that passes through said light transmission device, wherein said light shade is mounted on said first surface of said light transmission device; and
   a connector disposed between said lens set and said beam splitter, wherein said connector comprises a first connection unit and a second connection unit interlockable with each other, and each detachable from the other; said light transmission device and said light shade mounted at said first connection unit, and said beam splitter mounted at said second connection unit; said beam splitter detachable from said second connection unit.

2. An interferometric measuring device, comprising:
a light source module adapted to generate a light beam;
a scan lens adapted to receive said light beam, said scan lens comprising:
- a lens set adapted to change the focus position of said light beam;
- a beam splitter adapted to split said light beam into a first light beam and a second light beam, wherein said first light beam passes through said beam splitter and falls upon a test object and said second light beam is reflected by said beam splitter;
- a light transmission device disposed between said lens set and said beam splitter and adapted to receive said second light beam that is reflected by said beam splitter, enabling one part of said second light beam to be partially reflected by said light transmission device onto said beam splitter and one other part of said second light beam to pass through said light transmission device; and
- a light shade fixedly mounted at said light transmission device and adapted to shade or absorb said second light beam that passes through said light transmission device; wherein said light transmission device defines a first surface and a second surface, said first surface faces toward said lens set, said second surface faces toward said beam splitter, and said light shade is mounted on said first surface of said light transmission device; and
- a sensor adapted to receive said first light beam that is scattered or reflected by said test object and said second light beam that is reflected by said light transmission device.

3. The interferometric measuring device as claimed in claim 2, further comprising at least one rotatable scan mirror disposed between said scan lens and said light source module and adapted to receive the light beam generated by said light source module and to change the falling location or angle of said first light beam and said second light beam.

4. The interferometric measuring device as claimed in claim 2, further comprising an adjustment device connected to said scan lens and adapted to adjust the distance between said scan lens and said test object.

5. The interferometric measuring device as claimed in claim 2, further comprising a polarization beam splitter disposed between said light source module and said scan lens, and adapted to guide said first light beam that is scattered or reflected by said test object and said second light beam that is reflected by said light transmission device and said beam splitter to said sensor.

6. The interferometric measuring device as claimed in claim 2, further comprising a compensative light transmission device disposed between said test object and said beam splitter.

* * * * *